Figure 3:
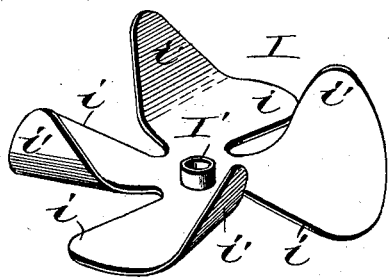

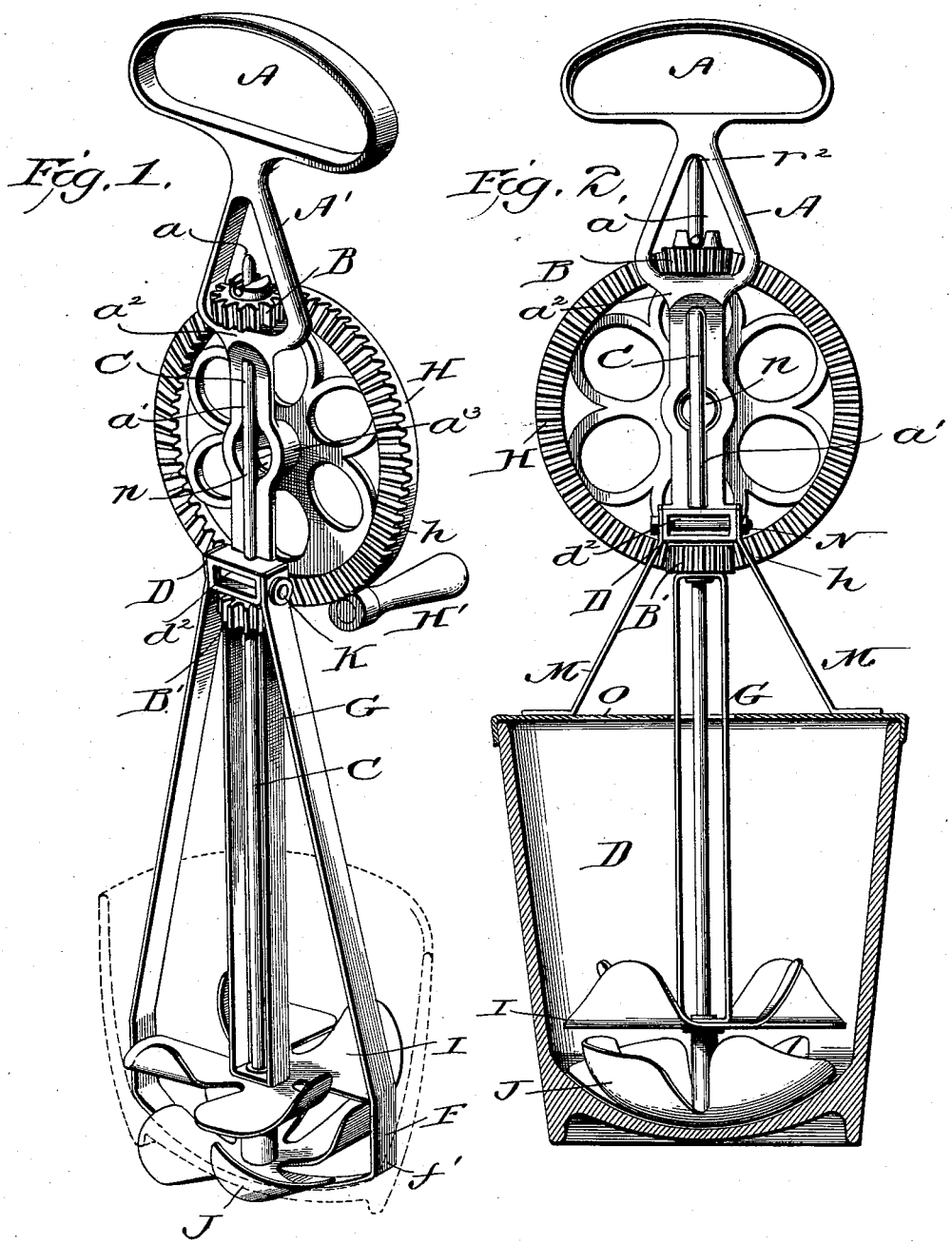

(No Model.) 2 Sheets—Sheet 2.

E. J. SCOPES.
EGG BEATER.

No. 599,661. Patented Feb. 22, 1898.

Witnesses

Inventor
Edward J. Scopes
by Wm. H. Babcock
Attorney

UNITED STATES PATENT OFFICE.

EDWARD J. SCOPES, OF ALBANY, NEW YORK.

EGG-BEATER.

SPECIFICATION forming part of Letters Patent No. 599,661, dated February 22, 1898.

Application filed February 5, 1896. Serial No. 578,132. (No model.)

*To all whom it may concern:*

Be it known that I, EDWARD J. SCOPES, a citizen of the United States, residing at Albany, Albany county, New York, have invented certain new and useful Improvements in Egg-Beaters; and I do hereby declare the following to be full, clear, and exact description of the invention, such as will enable others skilled in the art to which it appertains to make and use the same, reference being had to the accompanying drawings, and to the letters of reference marked thereon, which form a part of this specification.

This invention relates especially to egg-beaters, cream-whips, and similar utensils having two reversely-rotating dashers in different horizontal planes, each dasher consisting of a series of flukes or blades and each fluke or blade having a forward cutting edge and an upwardly-bent rear part. Heretofore in devices thus constructed and operated the under faces or lower lines of the dashers have been in a horizontal plane. This prevents the perfect action of the lower dasher on the material at the bottom of a cup, small bowl, or other vessel having a concave surface, the class of vessels or receptacles in which these beaters are most often used. There is a tendency in such cases to leave a layer of egg or other material uncut and unbeaten at the bottom of the cup or bowl. In bowls of considerable size this disadvantage may be partly overcome by tilting the beater successively in divers directions, thereby bringing the flukes nearer the bottom at various points; but this procedure is inconvenient and by no means perfectly effective. Moreover, it is inapplicable to cups of small diameter. Consequently egg-beaters and cream-whips of this kind have not hitherto worked well except in flat-bottomed dishes, where the horizontal lower face of the lower dasher could lie parallel with the flat surface of the bottom of the dish and nearly touch the same at all points of its rotation. To obviate this defect and extend the field of satisfactory service and usefulness of these implements or utensils, I curve upwardly the flukes of the lower dasher from the center thereof, giving its lower face as a whole a convex shape adapted to fit close to the surface of the concave bottom of a cup, so that the cutting edges of the flukes will act on even the lowest layer of egg or other material, taking it up for further action by the rear parts of these flukes and by the flukes of the upper dasher.

My invention therefore consists partly in the important improvement above mentioned.

It also consists in certain improvements in the construction of the shank, in the means of attaching the frames or supports thereto and to the flukes and gearing, and in certain additional features of construction and combination hereinafter more particularly set forth and claimed.

Figure 6:
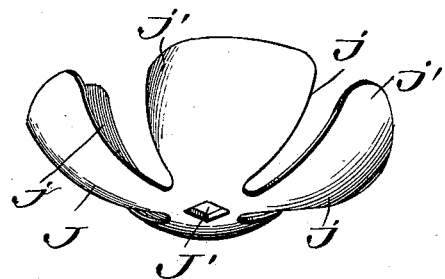
Figure 4:
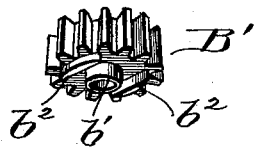
Figure 5:
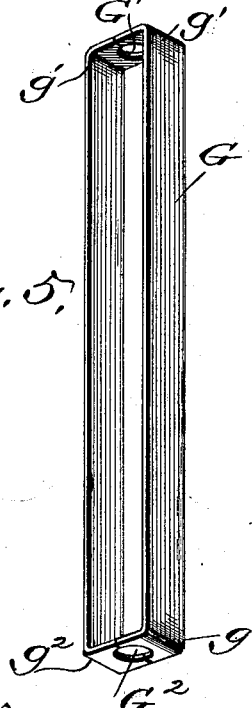
Figure 7:
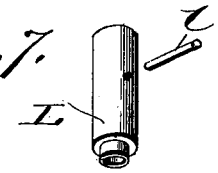
Figure 8:
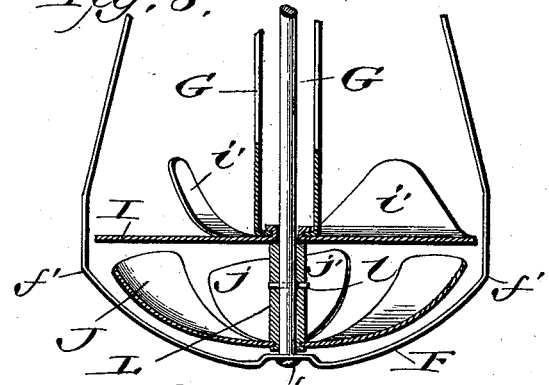
Figure 9:
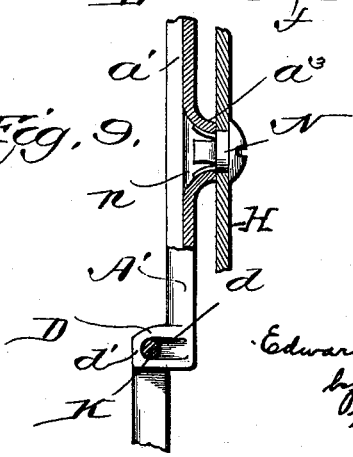

In the accompanying drawings, Figure 1 represents a perspective view of the preferred form of egg-beater embodying my invention, the cup in which the same is used being shown as broken away. Fig. 2 represents a rear elevation of a slightly-different form of the said egg-beater, illustrated as used in a tumbler or other receptacle of similar form. Fig. 3 represents a detail perspective view from above of the upper dasher before its raised hub has been riveted down to fasten the supporting-frame. Fig. 4 represents a similar view from below of the lower pinion before the attachment of the said frame. Fig. 5 represents a detail perspective view of the said frame. Fig. 6 represents a detail perspective view from below of the lower dasher. Fig. 7 represents a detail view of the sleeve before the attachment thereof to the said lower dasher. Fig. 8 represents a vertical section through the two dashers, the sleeve, and the lower part of the spindle on the line of the fastening-pin; and Fig. 9 represents a detail view, partly in side elevation, partly in vertical section, of the means of attaching the main gear-wheel and the supports of the upper dasher to the handle-shank.

A designates a handle of the ordinary loop form, having a shank A' cast therewith. The upper part of this shank is broadened to provide room for an opening $a$ of approximately triangular form, in the lower part of which turns a pinion B, fast on the rotary spindle C of the lower fluked dasher J, which turns therewith. Said spindle has its bearings in a groove $a'$, extending from said opening to and through the lower end of the said shank. This groove is open on the rear side of the shank, except where closed at $a^2$ just below the opening $a$ and again at the bottom, where a grooved end piece D, forming a part of the handle-casting, extends rearward from the said shank and also beyond both sides of the latter. Just below this end piece a pinion B', similar to B in size and operation, is mounted freely on spindle C and connected by a supporting-frame G with the upper dasher I. The shank A' is provided on its front with a boss $a^3$, made tubular to receive a headed or riveted bearing-stud N, the hollow interior of the said boss communicating at $n$ for the convenience of casting with the groove $a$. A driving gear-wheel H, having a crank-handle H' and cogs $h$ on its rear face, meshes with these pinions B B' at opposite points of its periphery in order that it may turn the two dashers in opposite directions, as is usual in egg-beaters of this general kind.

Each of the dashers consists of a series of flukes having a cutting forward edge $i$ or $j$ and an upwardly-bent rear part $i'$ or $j'$, the flukes of each dasher being cast in one piece or integrally formed of sheet metal in any convenient way. The sheet-metal dashers are commonly used for light household purposes and the cast-metal dashers for more wholesale operations, as by confectioners or large hotels, where the parts must be on a larger scale, require greater weight, and are subjected to more strain. The upper dasher I may retain, as shown, the horizontal shape of its lower parts from the center to the periphery, although it will be the better for copying the form of the lower dasher J, since either dasher or beater I or J will more effectively act on the egg or other material when having the concave form by reason of throwing such material more directly upward. The concave form of dasher or beater is also much more conveniently and cheaply manufactured. The latter, as illustrated in Figs. 1 and 6, is concaved upward from the center, each fluke being curved upwardly in the arc of a circle from the center of the dasher to its periphery, so that the lower face of the said dasher as a whole is of such convexity as to fit very closely the concave surface of the bottom of an ordinary coffee-cup or small bowl, so that none of its contents may remain undisturbed at the bottom.

As shown in Fig. 8, there is a lower bearing at $f$ for the lower end of spindle C in the middle of a frame F, consisting of a metallic strip having approximately a pear shape, so as to present two guard-bars, one on each side of the dashers, and rounded at its lower corners $f'$, so as to conform nearly to the concavity of the surface of the bottom of the cup. The bottom part of this frame is very slightly below the lower dasher, but not enough to keep it at any appreciable distance from the said surface. The upper ends of this frame F are fastened by a bolt or rivet K to the sides of end piece D of shank A' and cover the outer sides of two grooves $d$, which extend horizontally rearward from the front of said end piece to corner-walls $d'$ at the rear of the latter. Excepting these corner-walls, the rear of the said end piece is open, a groove or recess $d^2$ being formed therein, which communicates at its middle with the groove $a'$ and at its ends with the rear ends of the grooves $d$ behind the corner-walls $d'$. The said bolt is passed through behind these corner-walls, and its middle part occupies the groove or recess $d^2$. It is fastened in the usual manner and braced in front by the body of shank A' and in the rear by the said corner-walls $d'$. Since the aforesaid grooves are all in the casting which comprises the handle-shank and end piece there is no need for boring or other subsequent manipulation.

The frame G', which connects the pinion B' with the upper dasher I, consists of two straight parallel bars or strips arranged with the spindle C between them and having their upper ends bent at right angles at $g'$, so as to meet, also their lower ends similarly bent at $g^2$ and meeting. These bars are preferably united in one piece. On the middle point of the frame G a hole G' is formed therein at the top and another, G², at the bottom, the former fitting a central downward-extending hub or projection $b'$ of the pinion B' and the latter fitting a similar upward projection or hub I' of a dasher I. These projections are riveted down on the said frame after it is thus fitted to them and hold it as eyelets, though with the advantage of being integral with the said pinion and dasher, respectively. Lugs $b^2$ on the bottom of the said pinion at each side thereof are provided with long straight inner faces and prevent the said frame G from turning even if the riveted projection $b'$ should fail to pinch sufficiently. If the pinion B' and dasher I are of cast metal, each of these parts is afterward made malleable, then centrally bored through, so that the hub or projection is a mere thin tubular shell easily rolled or riveted over for the purpose stated. When sheet metal is the material of the dasher I, the hub I' is drawn into the desired shape by suitable mechanism in the manner usual in forming shells and other tubes.

The above construction of the pinion B' and dasher I with malleable central projections not only saves the expense of eyelets, but provides a much more durable fastening. When eyelets have been used for fastening the dasher, it has been found that they soon wore out under the grinding action of the sleeve L, hereinafter described, so that the frame G and the dasher I would separate. The projection I', being wholly on the upper side of the dasher, does not come into contact with the said sleeve at all, is subjected to no grinding, and, being integral with said dasher, is more secure in every way. The said sleeve L (illustrated in detail in Figs. 7 and 8) tightly fits the lower part of the spindle C and is fastened thereto by a pin $l$. The lower end of the said sleeve is provided with a malleable tubular hub or offset of reduced diameter. The center of the lower dasher J is provided with a prismatic hole J', which receives the said tubular hub or projection. A punch is then introduced into the latter from below and it is spread to fit the said opening, after which it is rolled or riveted to fasten the said dasher and sleeve securely together.

As shown in Fig. 2, I sometimes dispense with frame F and fasten to the end piece D in its stead the upper ends of a pair of short diverging bars M, having attached to their lower ends a cover O for a tumbler D' or other similar article or receptacle. This cover of course prevents splashing, and it is applied to the tumbler in the act of introducing the egg-beater therein. A detachable means of fastening, such as the bolt N', is used, so that the cover may be removed when, owing to the height of the receptacle or some other cause, it would be in the way.

Having thus described my invention, what I claim as new, and desire to secure by Letters Patent, is—

1. An egg-beater having dashers and means for operating them, in combination with a handle to which the said means are operatively attached, supports attached to the shank of the handle and a rivet or bolt for effecting the latter attachment, the said shank being provided with a longitudinal groove, a pair of grooves in its sides, extending from the front of the shank nearly to the rear and a groove or recess in the rear of the shank, which communicates at its middle with the longitudinal groove aforesaid and at its ends with the said grooves in the sides, leaving a space for the fastening rivet or bolt to extend transversely of the shank near the rear thereof and attach the said supports securely substantially as set forth.

2. The handle-shank of an egg-beater provided with a groove throughout its length and with an end piece D, having in its rear a groove or recess communicating therewith, as well as grooves in its sides communicating with this rear groove, said end piece having also corner-walls at its rear corners as described, in combination with dashers, means for operating them including a spindle which turns in the said longitudinal groove, a rivet or bolt passing through the said end piece between the said corner-walls and the said shank and bars forming a frame or means of support which are held by said rivet or bolt to said end pieces and cover the outer sides of the grooves in the side of the latter substantially as set forth.

3. An egg-beater having a plurality of flukes in two oppositely-rotating series, one above the other, the said flukes having rear upturned edges and forward cutting edges and the lower flukes being also concaved from their center of rotation upwardly, thereby adapting them to fit close to the surface of the concaved bottom of a cup dish or other similar receptacle in which the beater is to be used substantially as set forth.

In testimony whereof I affix my signature in presence of two witnesses.

EDWARD J. SCOPES.

Witnesses:
W. M. BROWN,
J. F. HARRIS.